US008856794B2

(12) United States Patent
Kruglick

(10) Patent No.: US 8,856,794 B2
(45) Date of Patent: Oct. 7, 2014

(54) MULTICORE RUNTIME MANAGEMENT USING PROCESS AFFINITY GRAPHS

(75) Inventor: Ezekiel John Joseph Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 499 days.

(21) Appl. No.: 12/578,321

(22) Filed: Oct. 13, 2009

(65) Prior Publication Data
US 2011/0088038 A1    Apr. 14, 2011

(51) Int. Cl.
G06F 9/46    (2006.01)
G06F 9/54    (2006.01)

(52) U.S. Cl.
CPC ........................ G06F 9/54 (2013.01)
USPC ............................ 718/102; 718/100; 718/104

(58) Field of Classification Search
USPC .......... 718/100, 102, 104, 105, 106; 709/223, 709/226
See application file for complete search history.

(56) References Cited

U.S. PATENT DOCUMENTS

| 4,210,962 A | | 7/1980 | Marsh et al. |
| 4,916,659 A | | 4/1990 | Persoon et al. |
| 5,349,656 A | * | 9/1994 | Kaneko et al. ................ 718/102 |
| 5,745,778 A | * | 4/1998 | Alfieri ................................. 712/1 |
| 5,806,059 A | | 9/1998 | Tsuchida et al. |
| 5,826,079 A | * | 10/1998 | Boland et al. ................. 718/102 |
| 6,289,369 B1 | * | 9/2001 | Sundaresan .................... 718/103 |
| 6,567,806 B1 | | 5/2003 | Tsuchida et al. |
| 6,658,448 B1 | * | 12/2003 | Stefaniak et al. ............. 718/104 |
| 6,745,336 B1 | | 6/2004 | Martonosi et al. |
| 6,769,017 B1 | * | 7/2004 | Bhat et al. ..................... 709/214 |
| 6,782,410 B1 | * | 8/2004 | Bhagat et al. ................. 709/201 |
| 7,143,412 B2 | * | 11/2006 | Koenen .......................... 718/102 |
| 7,146,607 B2 | | 12/2006 | Nair et al. |
| 7,363,523 B2 | | 4/2008 | Kurts et al. |
| 7,383,396 B2 | | 6/2008 | Wyman |
| 7,437,581 B2 | | 10/2008 | Grochowski et al. |
| 7,574,567 B2 | | 8/2009 | Wyman |

(Continued)

FOREIGN PATENT DOCUMENTS

EP    1736851 A2    12/2006
JP    H08315598 A    11/1996

(Continued)

OTHER PUBLICATIONS

Song et al, "Feedback-Directed Thread Scheduling with Memory Considerations", ACM, Jun. 2007, pp. 1-10.*

(Continued)

Primary Examiner — Charles Swift
(74) Attorney, Agent, or Firm — Hope Baldauff, LLC

(57) ABSTRACT

Technologies are generally described for runtime management of processes on multicore processing systems using process affinity graphs. Two or more processes may be determined to be related when the processes share interprocess messaging traffic. These related processes may be allocated to neighboring or nearby processor cores within a multicore processor using graph theory techniques as well as communication analysis techniques to evaluate interprocess communication needs. Process affinity graphs may be established to aid in determining grouping of processors and evaluating interprocess message traffic between groups of processes. The process affinity graphs may be based upon process affinity scores determined by monitoring and analyzing interprocess messaging traffic. Process affinity graphs may further inform splitting process affinity groups from one core onto two or more cores.

22 Claims, 7 Drawing Sheets

(56) References Cited

U.S. PATENT DOCUMENTS

| | | | |
|---|---|---|---|
| 8,051,418 B1* | 11/2011 | Dice | 718/102 |
| 8,078,832 B1 | 12/2011 | Agarwal et al. | |
| 8,108,843 B2 | 1/2012 | Nair et al. | |
| 8,181,169 B2 | 5/2012 | Nakaike et al. | |
| 8,214,817 B2 | 7/2012 | Mendelson et al. | |
| 8,443,341 B2 | 5/2013 | Berg et al. | |
| 2003/0171907 A1 | 9/2003 | Gal-On et al. | |
| 2003/0236919 A1* | 12/2003 | Johnson et al. | 709/251 |
| 2004/0181730 A1 | 9/2004 | Monfared et al. | |
| 2005/0154861 A1* | 7/2005 | Arimilli et al. | 712/216 |
| 2005/0210472 A1* | 9/2005 | Accapadi et al. | 718/105 |
| 2005/0246461 A1* | 11/2005 | Accapadi et al. | 710/200 |
| 2006/0041599 A1 | 2/2006 | Tsuchida et al. | |
| 2006/0225074 A1* | 10/2006 | Vaid et al. | 718/102 |
| 2006/0259800 A1 | 11/2006 | Maejima | |
| 2007/0027972 A1* | 2/2007 | Agrawal et al. | 709/223 |
| 2007/0044084 A1 | 2/2007 | Wang et al. | |
| 2007/0079308 A1* | 4/2007 | Chiaramonte et al. | 718/1 |
| 2007/0124457 A1* | 5/2007 | May et al. | 709/224 |
| 2007/0226752 A1 | 9/2007 | Davis et al. | |
| 2008/0046895 A1* | 2/2008 | Dillenberger et al. | 718/105 |
| 2008/0126751 A1* | 5/2008 | Mizrachi et al. | 712/30 |
| 2008/0178183 A1* | 7/2008 | Accapadi et al. | 718/102 |
| 2008/0181283 A1 | 7/2008 | Elhanati et al. | |
| 2008/0229127 A1 | 9/2008 | Felter et al. | |
| 2009/0031317 A1* | 1/2009 | Gopalan et al. | 718/103 |
| 2009/0031318 A1* | 1/2009 | Gopalan et al. | 718/103 |
| 2009/0070553 A1 | 3/2009 | Wallach et al. | |
| 2009/0077562 A1* | 3/2009 | Sen et al. | 718/105 |
| 2009/0125894 A1 | 5/2009 | Nair et al. | |
| 2009/0126006 A1* | 5/2009 | Zhang et al. | 726/17 |
| 2009/0187915 A1* | 7/2009 | Chew et al. | 718/104 |
| 2010/0017804 A1* | 1/2010 | Gupta et al. | 718/102 |
| 2010/0037222 A1 | 2/2010 | Tatsubori et al. | |
| 2010/0122101 A1 | 5/2010 | Naffziger et al. | |
| 2010/0191854 A1* | 7/2010 | Isci et al. | 709/226 |
| 2010/0225496 A1 | 9/2010 | Hou et al. | |
| 2011/0004692 A1* | 1/2011 | Occhino et al. | 709/228 |
| 2011/0088021 A1 | 4/2011 | Kruglick | |
| 2011/0088022 A1 | 4/2011 | Kruglick | |
| 2011/0088041 A1* | 4/2011 | Alameldeen et al. | 718/105 |
| 2011/0093733 A1 | 4/2011 | Kruglick | |
| 2011/0302585 A1* | 12/2011 | Dice | 718/102 |

FOREIGN PATENT DOCUMENTS

| | | | |
|---|---|---|---|
| JP | 2005085164 A | 3/2005 | |
| JP | 2008513912 A | 5/2006 | |
| JP | 2006318380 A | 11/2006 | |
| JP | 2008306522 A | 12/2008 | |

OTHER PUBLICATIONS

Albonesi, D., "Selective Cache Ways: On-Demand Cache Resource Allocation," Nov. 1999, Proceedings of the International Symposium on Microarchitecture, 12 pages.

Bala, et al., "Dynamo: A Transparent Dynamic Optimization System," Jun. 2000, Proceedings of Programming Language Design and Implementation, 12 pages.

Baraz, et al., "IA_32 Execution Layer: A Two-Phase Dynamic Translator Designed to Support IA-32 Application on Itanium®-based Systems," Dec. 2003, Proceedings of the 36th International Symposium on Microarchitecture, 11 pages.

Dehnert, et al., "The Transmeta Code Morphing™ Software: Using Speculation, Recovery, and Adaptive Retranslation to Address Real-Life Challenges," 2003, ACM International Conference Proceedings Series, vol. 37, Proceedings of the International Symposium on Code Generation and Optimization: Feedback-directed and Runtime Optimization, Abstract, 9 pages.

Ebcioglu, et al., "DAISY: Dynamic Compilation for 100% Architectural Compatibility," 1997, Proceedings of the 24th International Symposium on Computer Architecture, 13 pages.

Kang et al., "Preliminary Study toward Intelligent Run-time Resource Management Techniques for Large Multi-Core Architectures," Apr. 15, 2008, University of Southern California—Information Sciences Institute, 2 pages.

Microsoft .net Framework, http://www.microsoft.com/net/, accessed Oct. 13, 2009, 1 page.

Song, et al., "Analytical Modeling and Optimization for Affinity Based Tread Scheduling on Multicore Systems", Jul. 14, 2009, IEEE Cluster 2009, New Orleans, Louisiana, 10 pages.

International Search Report & Written Opinion dated Feb. 3, 2011 in PCT Application No. PCT/US10/53110.

U.S. Office Action dated Jun. 20, 2012 in U.S. Appl. No. 12/578,295.
U.S. Office Action dated Jun. 21, 2012 in U.S. Appl. No. 12/578,336.
U.S. Office Action dated Nov. 14, 2011 in U.S. Appl. No. 12/582,301.
U.S. Office Action dated Jun. 28, 2012 in U.S. Appl. No. 12/582,301.

Brooks et al., "Dynamic Thermal Management for High-Performance Microprocessors" Jan. 2001, Proceedings of the 7th International Symposium on High Performance Computer Architecture, 12 pages.

Donald et al., "Techniques for Multicore Thermal Management: Classification and New Exploration". Jun. 2006, Proceedings of the 33rd Annual International Symposium on Computer Architecture, pp. 78-88.

Shirako et al., "Compiler Control Power Saving Scheme for Multi Core Processors" In Lecture Notes in Computer Science: Languages and Compilers for Parallel Computing. vol. 4339/2006. Springer-Verlag, Berlin, pp. 362-376, 2007.

"P6T New Era for Ultimate Performance! Intel® Core™ i7 Platform," accessed at http://www.asus.com/Motherboards/Intel_Socket_1366/P6T/, accessed on Mar. 5, 2012, pp. 4.

U.S. Office Action dated Nov. 21, 2012 in U.S. Appl. No. 12/578,295.
U.S. Office Action dated Nov. 21, 2012 in U.S. Appl. No. 12/578,336.
Notice of Allowance dated Aug. 28, 2013 in U.S. Appl. No. 12/578,295.
Notice of Allowance dated Sep. 17, 2013 in U.S. Appl. No. 12/578,336.
Japanese Office Action dated Sep. 3, 2013.
Simon, CS 267: Applications of Parallel Computers Lecture 17: Parallel Sparse Matrix-Vector Multiplication; pp. 66; Oct. 22, 2002. http://www.cs.berkeley.edu/~strive/cs267.
U.S. Official Action dated Jan. 2, 2014 in U.S. Appl. No. 12/582,301.

* cited by examiner

| AFFINITY SCORE TABLE 300 | | | | | | | |
|---|---|---|---|---|---|---|---|
| | PROCESS 2 | PROCESS 3 | PROCESS 4 | PROCESS 5 | PROCESS 6 | PROCESS 7 | PROCESS 8 |
| PROCESS 1 | 33 | 9 | 14 | 31 | 52 | 41 | 61 |
| PROCESS 2 | | 45 | 2 | 12 | 26 | 0 | 56 |
| PROCESS 3 | | | 37 | 53 | 11 | 31 | 30 |
| PROCESS 4 | | | | 24 | 9 | 0 | 0 |
| PROCESS 5 | | | | | 39 | 0 | 21 |
| PROCESS 6 | | | | | | 7 | 4 |
| PROCESS 7 | | | | | | | 67 |

700 A COMPUTER PROGRAM PRODUCT

702 A SIGNAL BEARING MEDIUM

704 AT LEAST ONE OF
- ONE OR MORE INSTRUCTIONS FOR MONITORING MESSAGE TRAFFIC BETWEEN PROCESSES IN THE MULTICORE PROCESSOR;
- ONE OR MORE INSTRUCTIONS FOR DETERMINING AFFINITY SCORES BETWEEN THE PROCESSES BASED ON THE MONITORED MESSAGE TRAFFIC;
- ONE OR MORE INSTRUCTIONS FOR ESTABLISHING A PROCESS AFFINITY GRAPH BASED UPON THE AFFINITY SCORES; OR
- ONE OR MORE INSTRUCTIONS FOR ALLOCATING ONE OR MORE PROCESSES TO ONE OR MORE PROCESSOR CORES OF THE MULTICORE PROCESSOR BASED UPON GROUPINGS IDENTIFIED WITHIN THE PROCESS AFFINITY GRAPH.

| A COMPUTER-READABLE MEDIUM 706 | A RECORDABLE MEDIUM 708 | A COMMUNICATIONS MEDIUM 710 |

MULTICORE RUNTIME MANAGEMENT USING PROCESS AFFINITY GRAPHS

BACKGROUND

Unless otherwise indicated herein, the materials described in this section are not prior art to the claims in this application and are not admitted to be prior art by inclusion in this section.

Multicore processors are generally made up of multiple processor cores with interconnections between the individual cores. Some architectures for interconnecting individual cores support communication between neighboring cores with high efficiency. However, communications between nonadjacent cores within the multicore processor may incur delays due to passing messages between intermediate cores. As core counts within multicore processors increase, optimization of communication between cores becomes increasingly important. These communications may include messages between processes or threads allocated to the different cores within the multicore processor.

Where two processes engaging in a large amount of interprocess communication are located at opposite corners, or otherwise distant positions, of a multicore processor, communication latencies and delays may rapidly accumulate. Such delays may significantly impact overall system performance. Fragmented or random assignments of related processes to cores within a multicore processor may result in vastly decreased performance and in some instances instabilities of the computing system. Traditional methods of allocating processes to processor cores may include syntax trees, random allocation, or focus on processor intensive processes. The present disclosure recognizes that these traditional approaches may fail to support real-time mechanisms for allocating processes to processor cores based upon actual interprocess communication needs. As such, these approaches generally provide non-optimal performance of the associated computing system.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is an affinity score table illustrating affinity between processes based upon interprocess message traffic;

FIG. 7 is a schematic illustrating a partial view of a computer program product that includes a computer program for executing a computer process on a computing device, all arranged according to at least some embodiments presented herein.

DETAILED DESCRIPTION

Figure 1:
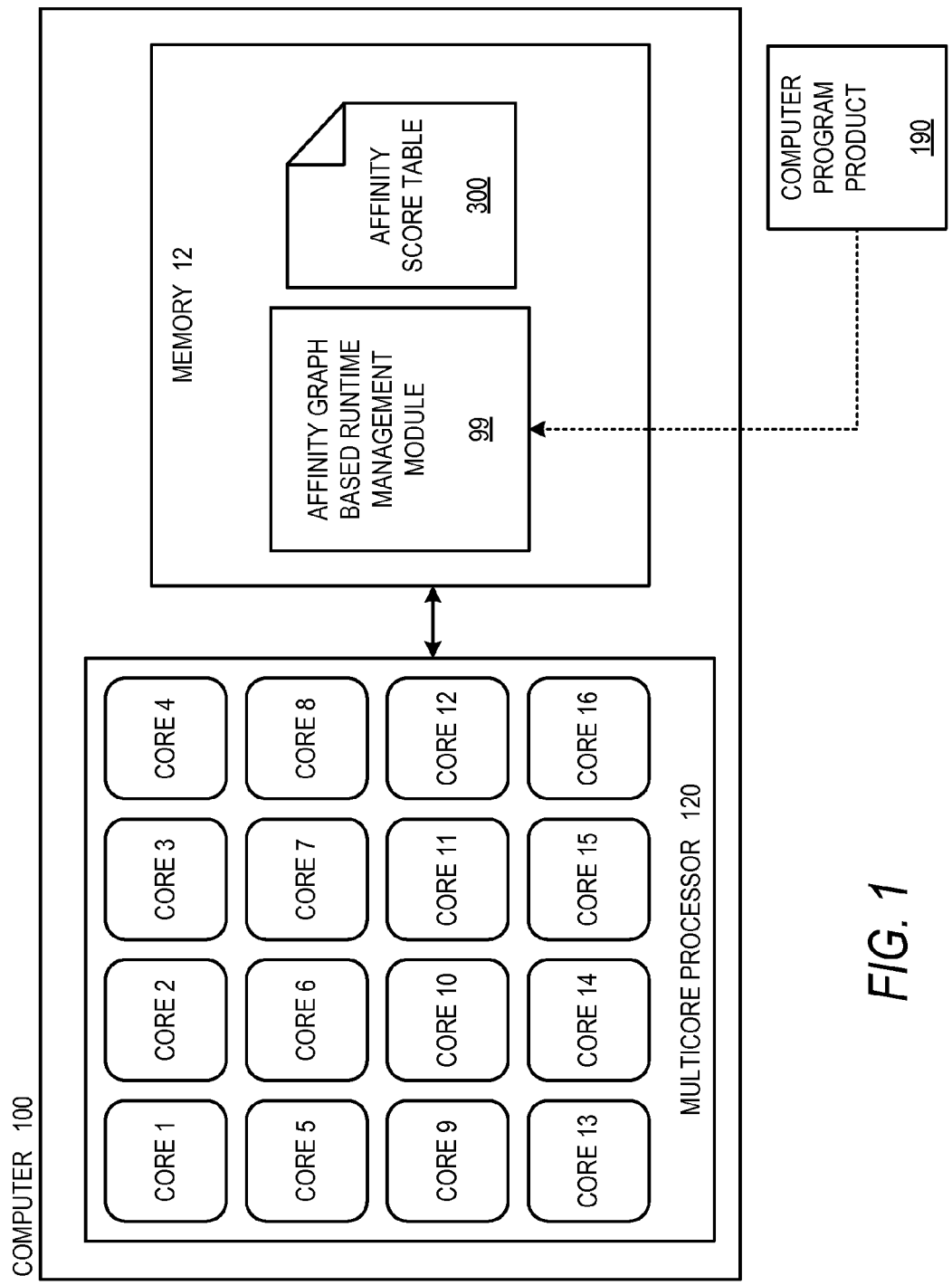
FIG. 1 is a block diagram illustrating a computer having a multicore processor and a memory configured for performing multicore runtime management using process affinity graphs.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is generally drawn to methods, apparatus, systems, and computer program products related to multicore runtime management using process affinity graphs. A process affinity graph may be described as a collection of graph nodes representing processes running on a computing system where related nodes are connected by an edge. Two or more nodes, or processes, may be determined to be related when the processes share interprocess messaging traffic. According to some embodiments presented herein, related processes may be allocated to neighboring, or nearby, processor cores within a multicore processor. Graph theory techniques and interprocess communication analysis techniques may be applied to evaluate efficient assignment of processes to processor cores.

Process affinity graphs may be established to aid in determining grouping of processes and evaluating interprocess message traffic between groups of processes. The process affinity graphs may be based upon process affinity scores determined by monitoring and analyzing interprocess messaging traffic. Certain processes occupying the center of a process affinity graph may be categorized as bridge processes. Bridge processes placed onto cores within a multicore processor may optimize communications between the bridge processes and multiple other processes or applications. Similarly, leaf processes which do not bridge between multiple processes, or groups of processes, may be identified within a process affinity graph. Such leaf processes may be allocated to cores within a multicore processor such that the leaf processes may not interfere with communication between other processes.

FIG. 1 is a block diagram illustrating a computer 100 having a multicore processor 120 and a memory 12 configured for performing multicore runtime management using process affinity graphs according to one or more embodiments presented herein. The computer 100 may employ multiple cores of the multicore processor 120 to perform various computing tasks. The computing tasks may be identified as processes executing on the computer 100. For the example illustrated in FIG. 1, sixteen cores are illustrated (Core 1, Core 2 . . . Core 16). However, the present disclosure is not limited to any particular number of cores in multicore processor 120.

Techniques for assigning individual processes of the computer 100 into respective cores of the multicore processor 120 are discussed herein. These assignments may be made to allocate processes that communicate with one another to cores that are physically close on the multicore processor 120.

The memory 12 may be coupled to the multicore processor 120 to support the techniques discussed herein. For example, the memory 12 may be configured to store an affinity score table 300 and an affinity graph based runtime management module 99. The affinity graph based runtime management module 99 may be executed (e.g. as a process or method) in association with the multicore processor 120 to apply communication traffic analysis and graph theory to assign processes to respective cores of the multicore processor 120. Technologies disclosed herein for multicore runtime management using process affinity graphs may be provided as a computer program product 190. According to some embodiments, the computer program product 190 may be provided as program code and associated data stored upon one or more computer-readable storage media such as semiconductor, magnetic or optical recordings on disc, tape, memories, or any other medium. According to some other embodiments, the computer program product 190 may also be provided as program code and associated data bundled for download or transmission over a network or communications link.

It should be appreciated that the techniques discussed herein may be implemented as hardware modules within, or associated with, the multicore processor 120. The modules may also be combinations of hardware and software according to various embodiments. For example, building the affinity score table 300 and processes affinity graphs to be applied to the runtime management of processes allocation to cores by one or more hardware modules. Additional details of the computer 100, including operation of the memory 12, are further detailed with respect to FIG. 6.

Figure 2:
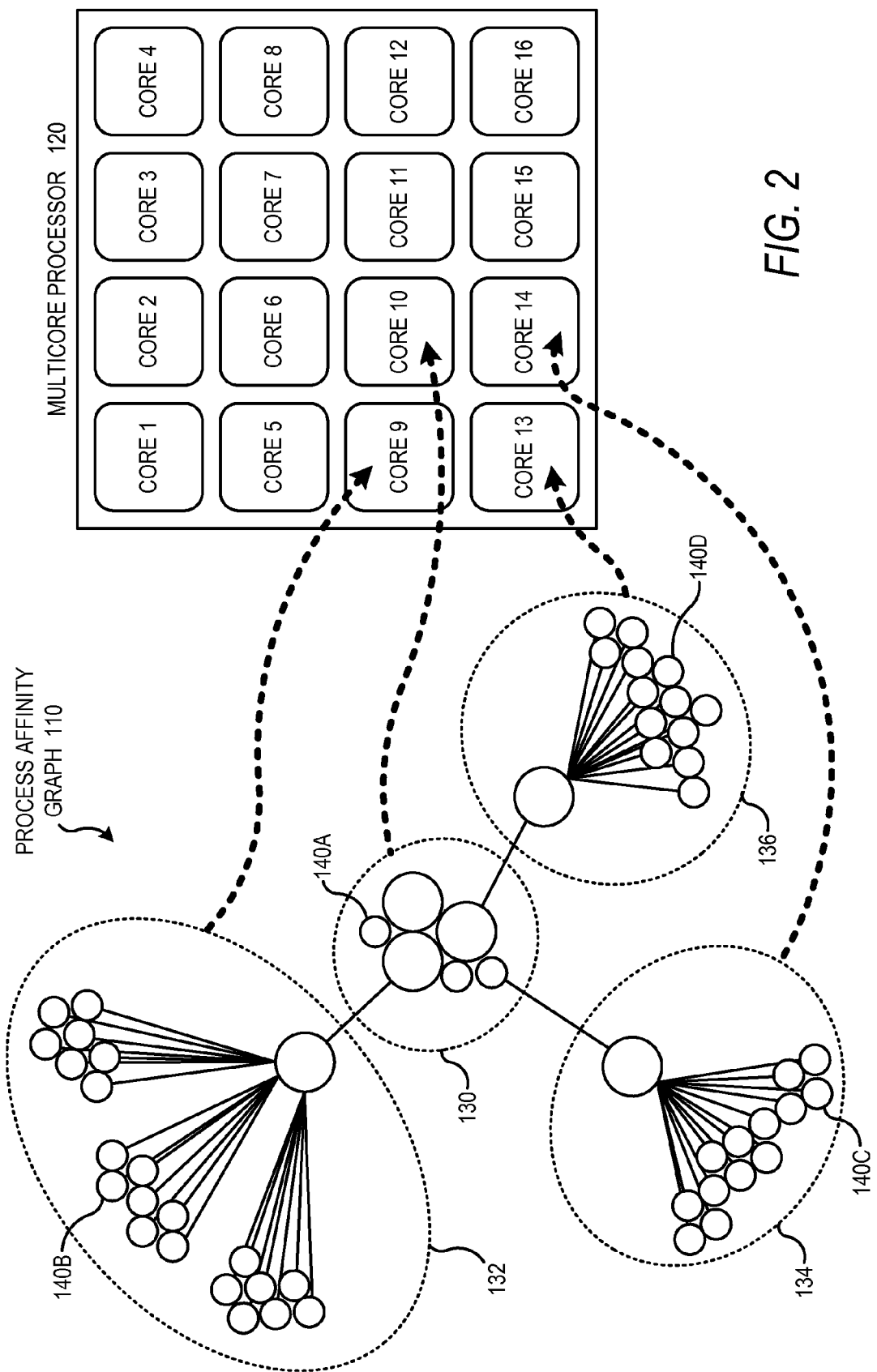
FIG. 2 is a mapping diagram illustrating a mapping of processes within a process affinity graph onto cores within a multicore processor.

Turning now to FIG. 2, a mapping diagram illustrates a mapping of processes 140A-140D within a process affinity graph 110 onto cores within a multicore processor 120 according to one or more embodiments presented herein. The process affinity graph 110 illustrates the interprocess communication relationships between the various processes 140A-140D associated with a multicore processor 120. The processes 140A-140D may be referred to collectively, or generically, as processes 140. The processes 140 may be collected into process affinity groups 130, 132, 134, and 136. These groups may be established such that related processes may be placed within the same affinity group. As discussed briefly above, related processes 140 are those processes that exchange interprocess communication messages or share related resources.

A first group 130 of processes 140A may share interprocess messaging between several other processes or groups of processes. As such, the first group 130 of processes 140A may be referred to as a group containing one or more bridge processes. The bridge processes within the first group 130 may communicate with a second group 132 of processes 140B, a third group 134 of processes 140C, and/or a fourth group 136 of processes 140D. The communications may include interprocess messaging.

Processes within each of the respective second group 132, third group 134, and/or fourth group 136 may share interprocess messages between one another while having little or no interprocess communication into the other of the groups. For example, one or more processes 140B within the second group 132 may communicate amongst one another while the processes within the second group 132 may generally have little or no interprocess communication with processes within the third group 134. As such, each grouping may be useful for allocating processes onto cores within the multicore processor 120 such that groups of processes communicating with one another may be placed onto the same core or onto adjacent cores.

The processes identified within an affinity group sharing interprocess messaging may also be placed onto near, or adjacent, cores within the multicore processor 120. For example, the first group 130, or bridge processes, may be allocated to core 10 while the second group 132 of processes 140B may be allocated to core 9. The adjacency of core 9 and core 10 may support interprocess communications between the processes 140A of the first group 130 and the processes 140B of the second group 132. These adjacent core communications may encounter reduced latency and delay in comparison to communications between processes that are physically distributed around the multicore processor 120. Similarly, processes 140C of the third group 134 may be allocated to core 14 such that the processes 140A of the first group 130 allocated to core 10 and the processes 140C allocated to core 14 may share interprocess communications in an efficient fashion due to the adjacency of core 10 to core 14 within the multicore processor 120. Also, processes 140D within the fourth group 136 may be allocated to core 13 within the multicore processor 120 such that processes 140D allocated to core 13 and processes 140A allocated to core 10 may share interprocess messaging traffic between adjacent cores with increased efficiency.

Processes within a group, such as the processes 140B within the second group 132, may be placed onto a common core of the multicore processor 120 or allocated to adjacent or nearby cores within the multicore processor. The frequent interprocess messaging between processes within a process affinity group may be supported with higher efficiency and lower latency by placing the processes onto a common core or on neighboring or nearby cores within the multicore processor 120.

Processes within the first group 130, or bridge processes, may be accessed or related to one or more other processes or applications. The bridge processes may be optimally placed in central or nearly central cores within the multicore processor 120. The bridge processes may also be allocated to cores supporting faster average memory access. Such bridge processes may support file handling, network handling, garbage collection, or other common functionality that may be used by multiple processes, methods, or applications.

It should be appreciated that concepts presented herein may be utilized to improve the performance of many different types of applications. For instance, a video conferencing application may involve processes related to video compression or decoding along with processes handling network ports or file access. Some of these processes may be provided as operating system services and thus may not appear to be related to the video conferencing application by having been launched from a common origin. Regardless, the process affinity graph 110 associated with the system may identify the interprocess messaging relationships between the video compression and decoding processes and the networking or file access processes. Thus, these processes may be allocated to one or more cores within a multicore processor 120 such that the interprocess messaging may have improved efficiency and reduced latency.

Empirical tests demonstrate that grouping related processes in physical proximity within a multicore processor 120 may improve system performance by up to three hundred percent or more. The improvement factors for such process groupings may increase as the number of cores within a multicore processor 120 increases.

Figure 3:
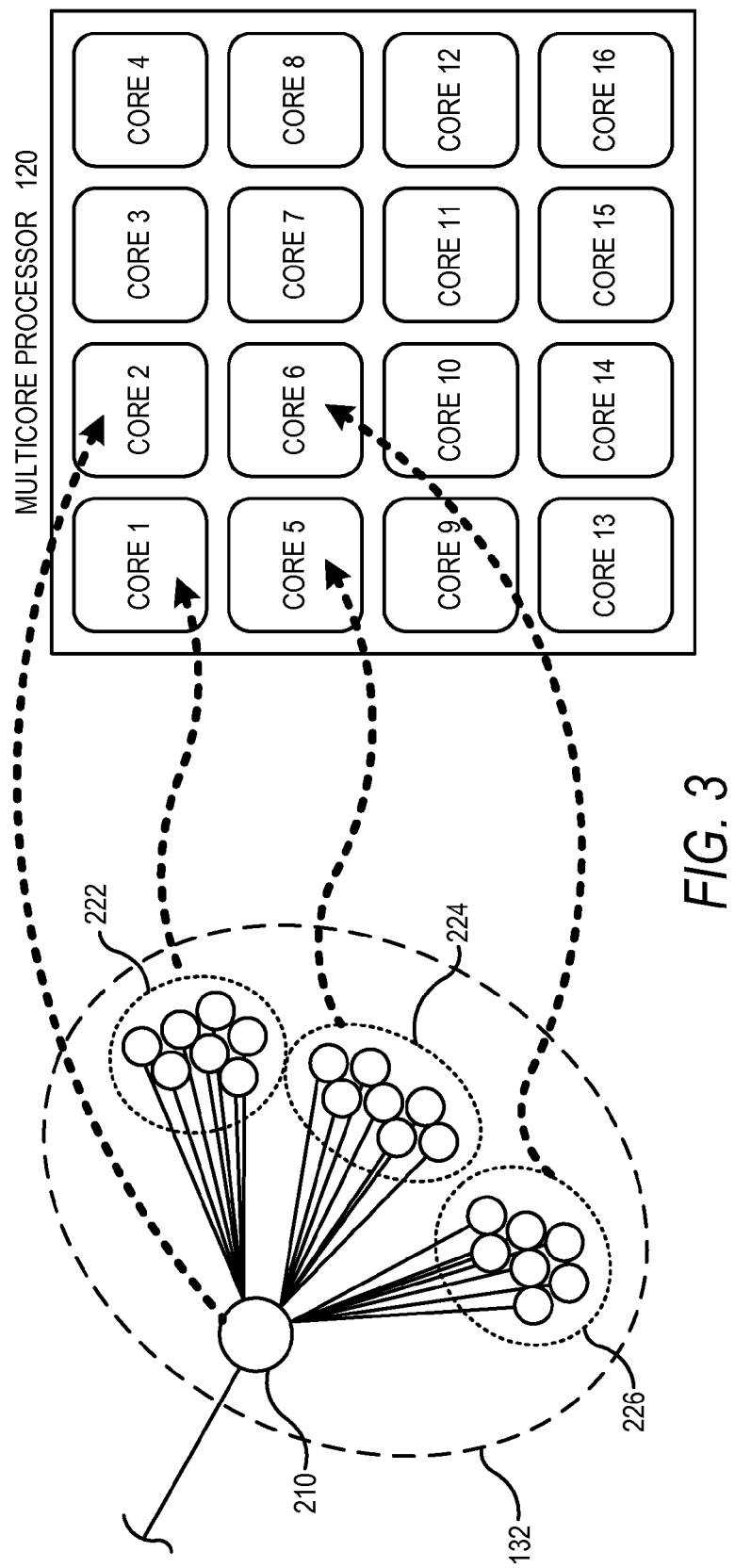
FIG. 3 is a mapping diagram illustrating process group splitting to reallocate processes from a single core onto multiple cores within a multicore processor.

Splitting of process affinity groupings may be performed when a current core supporting a group of processes becomes too busy. It may then be desirable to split one or more of the processes associated with the core supporting the group of processes onto one or more other cores. The reallocation onto other cores may be performed such that interprocess communication efficiency may be maintained by once again allocating processes 140 that are related by interprocess communication to neighboring or nearby cores within the multicore processor 120. FIG. 3 illustrates an example splitting process.

In FIG. 3, a mapping diagram illustrates process group splitting to reallocate processes from a single core onto multiple cores within a multicore processor 120 according to one or more embodiments presented herein. A grouping 132 of processes 140B may be further divided into related processes such as process 210, group 222 of processes, group 224 of processes, and/or group 226 of processes. These four processes, or groups of processes, may then be reallocated from one core (e.g., core 9 as illustrated in FIG. 2) onto additional cores (e.g., core 1, core 2, core 5, and/or core 6) of the multicore processor 120. The reallocation may occur such that the central process 210 may be allocated to a specific core (e.g., core 2) where the adjacency between the other cores (e.g., core 1 and core 2 are adjacent; core 1 and core 5 are adjacent; core 5 and core 6 are adjacent, etc.) may support interprocess communications between the central process 210 and the respective groups 222, 224, and/or 226 of processes 140. Such group splitting and reallocation may be guided by the process affinity graph 110.

FIG. 4 is an affinity score table 300 illustrating affinity between processes based upon interprocess message traffic according to one or more embodiments presented herein. An affinity score between any pair of processes 140 may be based upon the quantity and/or bandwidth of interprocess messaging between the processes 140. The affinity score may be a total of the number of interprocess messages passed between two processes 140. The affinity score may also be a measure of the bandwidth of interprocess communication between two processes 140. The affinity score may be expressed as a fraction of total interprocess communication traffic, a tally of the number of messages during a sample time, any other traffic metric, or any combination thereof. While the affinity scores between eight processes (Process 1, Process 2 . . . Process 8) are illustrated, affinity scores for any number of processes may be monitored.

Affinity scores may be used to establish a process affinity graph associated with the multicore processor 120, such as process affinity graph 110. The values in the affinity score table 300 may be employed to represent the process affinity graph 110 without the explicit generation of the process affinity graph 110. Also, the measure of interprocess communications described herein are merely examples, and additional methods of measuring and/or rating interprocess communications are contemplated.

According to some embodiments, a non-zero entry in the affinity score table 300 may represent an edge between two nodes of the process affinity graph 110, while a zero entry between to processes may represent that no edge is present between the respective nodes of the process affinity graph 110.

According to some other embodiments, the values within the affinity score table 300 may represent weights of edges within the process affinity graph 110. For example, higher weighted edges may imply that nodes connected by the edge may represent processes engaging in higher interprocess communication. In one example, two processes with increased interprocess communication, and thus with a higher weighted edge attaching their respective nodes, may be placed on the same, neighboring, or nearby cores within the multicore processor 120.

The processes 140 associated with the affinity score table 300 may be tracked by a process ID or some other identifier associated with the processes 140 such as a characteristic of the process itself. The affinity scores within the affinity score table 300 may be influenced by a time limiting mechanism. For example, the affinity scores may be collected over a period of time and then used for a future period of time during which a next set of affinity scores may be collected.

In some examples, the affinity score table 300 may decay over time by applying a time based, or time varying, function such as score'=score·f(t). The time based function, such as f(t), may be a linear function, a non-linear function, or some combination thereof. An example linear function may be $f(t)=1-(a \cdot t^2+b \cdot t+c)$, where a, b and c are constants that may either be set to zero or some other value. An example non-linear functions may be $f(t)=(1-e^{-d \cdot t})$, where d is a non-zero valued constant. In some additional examples, the affinity score table 300 may be periodically flushed (e.g., set to zero) or periodically reset to some initial values (e.g., set to a zero or non-zero value). In addition to the example described above, any other process for time limiting the affinity scores with the affinity score table 300 may be used to aid in keeping the affinity scores relevant to current or recent conditions of the processes 140 associated with the multicore processor 120.

The affinity score table 300 may be maintained by a supervisory process. The supervisory process may be associated with the operating system using the multicore processor 120. The supervisory process may also be associated with the firmware or basic input/output system (BIOS) of the associated computing system. According to some embodiments, the supervisory process for maintaining the affinity scores or the affinity score table 300 may be supported by software and/or hardware within the multicore processor 120, or by one or more software and/or hardware modules (e.g., circuits) of the associated computing system.

Figure 5:
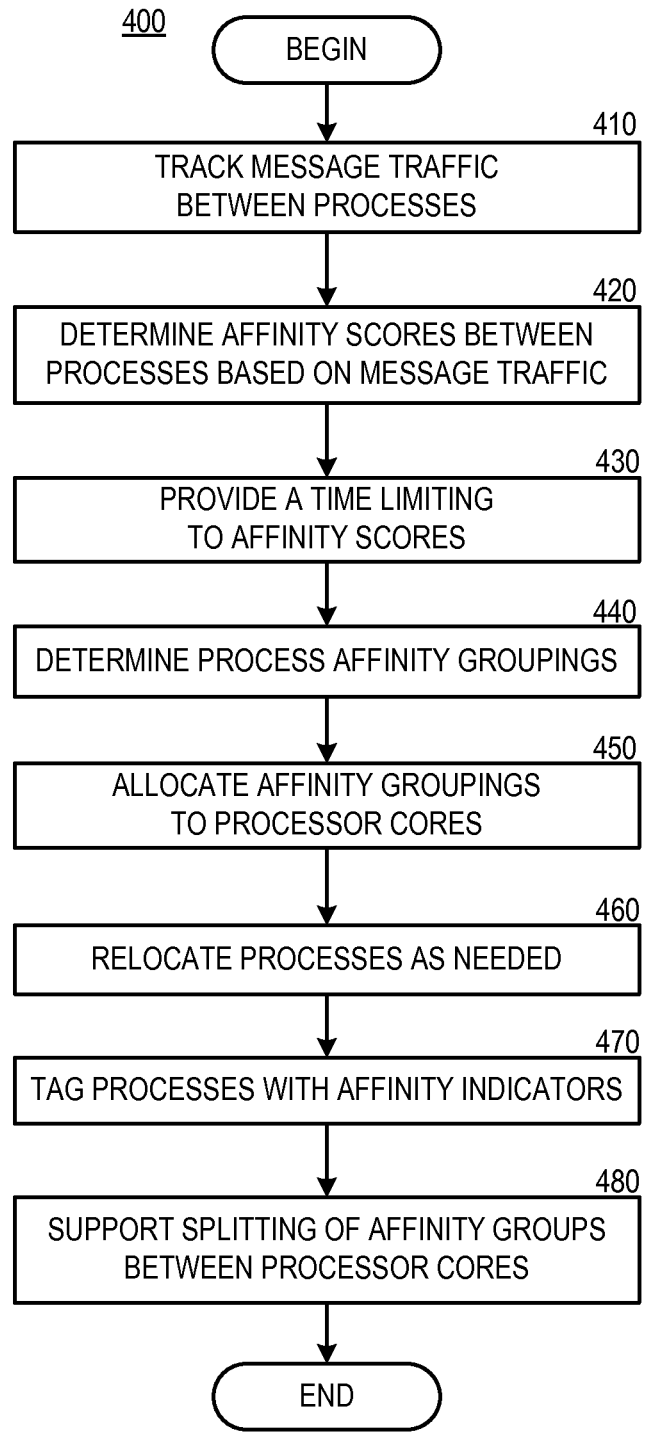
FIG. 5 is a flow diagram illustrating a process for multicore runtime management using process affinity graphs.

Referring now to FIG. 5, additional details will be provided regarding the embodiments presented herein for managing processes associated with a multicore processor computing system. In particular, FIG. 5 is a flow diagram illustrating a process 400 for multicore runtime management using process affinity graphs according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, functions, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

Process 400 may include various operations, functions or actions as illustrated by one or more of blocks 410, 420, 430, 440, 450, 460, 470, and/or 480. The process 400 may begin at block 410 (Track Message Traffic Between Processes), where an affinity score table 300 may be utilized by process 400 to track (or monitor) interprocess message traffic. Interprocess message traffic may be shared between processes 140 executing on the multicore processor 120. Interprocess message traffic may be used to communicate shorter status information between processes such as user interface events, trigger, or semaphores. Interprocess message traffic may also carry more substantive information such as communication packets, application data, or storage device traffic. Block 410 may be followed by block 420.

At block 420 (Determine Affinity Scores between Processes Based on Message Traffic), affinity scores may be determined by process 400 based upon interprocess message traffic as monitored in block 410. The quantity or bandwidth of interprocess messages may be used to establish affinity scores, such as those associated with the affinity score table 300. For example, monitoring a quantity of interprocess messages may involve determining the number of messages within specified measurement period. The tracking or monitoring of the interprocess message traffic to establish affinity scores may be performed by a supervisory process or by dedicated circuits or hardware modules. Block 420 may be followed by block 430.

At block 430 (Provide a Time Limiting to Affinity Scores), a time limiting mechanism may be provided to flush or decay affinity scores. Time limiting of affinity scores may support keeping the affinity score table 300 relevant to current, or near current, operating conditions of the multicore processor 120. For example, the affinity scores may be adjusted according to a time varying function. Various example techniques may be used to provide the time limiting mechanism as discussed previously with respect to FIG. 4. Block 430 may be followed by block 440.

At block 440 (Determine Process Affinity Groupings), process affinity groupings may be determined based upon the affinity scores determined in block 420. Affinity groupings may be used to partition a set of processes 140 associated with the multicore process 120 into affinity groups as previously discussed. The processes 140 within each affinity group may generally share interprocess messaging traffic among one another, while processes in two separate affinity groups may share little, or no, interprocess communication traffic. Block 440 may be followed by block 450.

At block 450 (Allocate Affinity Groupings to Processor Cores), the processes 140 within each respective affinity grouping determined at block 440 may be allocated to processor cores within the multicore processor 120. The groupings may be allocated to cores such that groups sharing interprocess communication traffic may be placed onto cores adjacent to, or near, one another. Such positioning may improve interprocess messaging efficiency and decrease interprocess messaging latency when messages are passed between processes 140 within different affinity groups. Block 450 may be followed by block 460.

At block 460 (Relocate Processes as Needed), processes may be relocated from one core to another core according to the affinity group allocations determined in block 450. An evaluation may be performed to determine if relocation of processes 140 will improve messaging efficiency enough to warrant the time, memory, or complexity costs of the relocation. Block 460 may be followed by block 470.

At block 470 (Tag Processes with Affinity Indicators), processes may be tagged with affinity indicators. The affinity indicator tags may be used at future executions of a process to inform initial process allocation to cores. The initial allocation may then be made using the affinity tag information before additional interprocess message traffic information is collected. Block 470 may be followed by block 480.

At block 480 (Support Splitting of Affinity Groups Between Processor Cores), splitting of affinity groups may be supported. Splitting of an affinity group may support transitioning a group of processes 140 from a single core within a multicore processor 120 onto two or more cores within the multicore processor 120. The transitioning may occur such that the subgroups split from the original affinity group are allocated to cores as discussed herein to reduce interprocess messaging overhead and latency. After block 480, the process may either repeat (e.g., periodically, continuously, or on demand as needed) or terminate.

Figure 6:
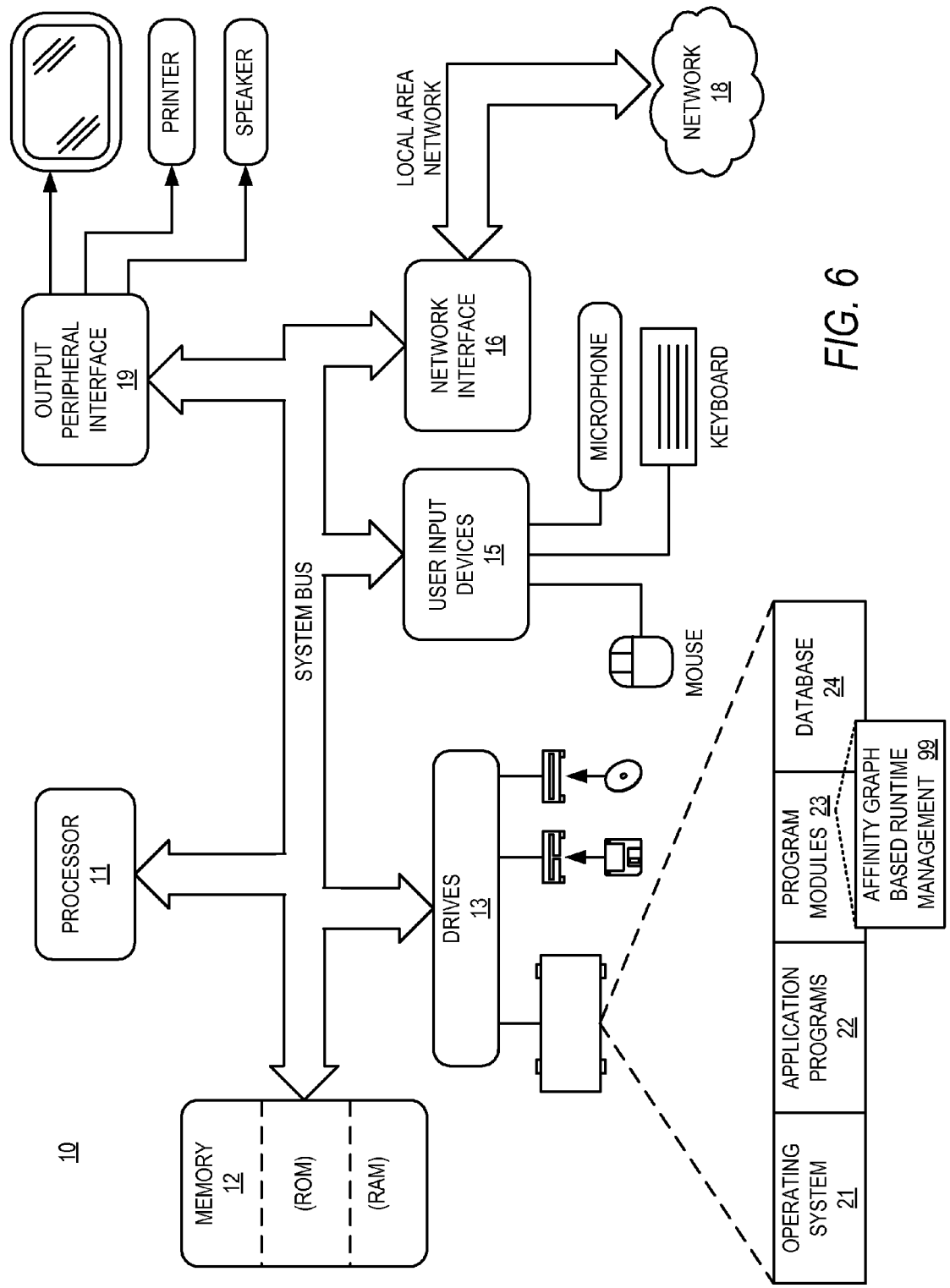
FIG. 6 is a block diagram illustrating an example computing system.

With reference to FIG. 6, an example computing system is illustrated for implementing various embodiments. The computing system can support embodiments for implementing multicore runtime management using process affinity graphs. For example, the computing system can comprise a program module 23 such as a module 99 configured to support affinity graph based runtime management or processes on a multicore processor. Various embodiments may include computers, dedicated hardware, or embedded computing systems.

The computing system includes a computer 10. According to various embodiments, the computer 10 may be the computer 100 discussed with respect to FIG. 1. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multicore processor 120, a multicore processing unit, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support runtime management of multicore processes based on affinity graphs as discussed herein.

The drives 13, other storage devices, or their associated computer-readable storage media may store an operating system 21, application programs 22, program modules 23, and a database 24. The computer 10 may include user input devices 15 through which a user may enter commands and data. Input devices may include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices may be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer may include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 may include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 may perform affinity graph based runtime management of processes associated with a multicore processor in accordance with embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 such as a process affinity graph based runtime management module 99. The program modules 23 may include software instructions that, when loaded into the processor 11 and executed, transform a general-purpose computing system into a special-purpose computing system customized to facilitate all, or part of, the process affinity graph based runtime management techniques disclosed herein. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 12 transitions between states, thereby transforming the transistors or other circuit elements constituting the processor 11 from a first machine to a second machine, wherein the second machine may be specifically configured to support affinity graph based runtime management for processes associated with multicore processors. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Turning now to FIG. 7, a schematic illustrates a partial view of a computer program product 700 that includes a computer program for executing a computer process on a computing device, according to some embodiments presented herein. An illustrative embodiment of the example computer program product is provided using a signal bearing medium 702, and may include at least one instruction of 704: one or more instructions for monitoring message traffic between processes in the multicore processor; one or more instructions for determining affinity scores between the processes based on the monitored message traffic; one or more instructions for establishing a process affinity graph based upon the affinity scores; or one or more instructions for allocating one or more processes to one or more processor cores of the multicore processor based upon groupings identified within the process affinity graph. The one or more instructions may be, for example, computer executable and/or logic implemented instructions. In some embodiments, the signal bearing medium 702 of the one or more computer program products 700 include a computer readable medium 706, a recordable medium 708, and/or a communications medium 710.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the described systems by an RF signal bearing medium 702, where the signal bearing medium 702 is conveyed by a wireless form of communications medium 710 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computer-implemented method to manage processes in a multicore processor using process affinity graphs, the method comprising:
    tracking interprocess message traffic for messages communicated between two or more related processes executing on separate processor cores of the multicore processor;
    determining affinity scores between each pair of the two or more related processes based at least in part on the tracked interprocess message traffic, wherein determining the affinity scores includes determining a total number of messages passed between the two or more related processes within a specified measurement period;
    assigning the two or more related processes to process affinity groups based at least in part on the affinity scores; and
    allocating the two or more related processes assigned to each process affinity group to one or more processor cores of the multicore processor based at least in part on the process affinity groups,
    wherein the allocating includes allocating the two or more related processes within a same process affinity group to physically adjacent separate processor cores within the multicore processor in response to the respective two or more related processes having higher affinity scores.

2. The method of claim 1, further comprising adjusting the affinity scores according to a time varying function.

3. The method of claim 1, further comprising evaluating the process affinity groups and relocating the two or more related processes between the one or more of the processor cores according to the evaluation of the process affinity groups in response to improved memory efficiency being greater than a cost of relocation.

4. The method of claim 1, further comprising evaluating the process affinity groups and splitting one of the process affinity groups into two or more subgroups allocated to separate processor cores of the multicore processor.

5. The method of claim 1, wherein each of the affinity scores reflects the total number of messages passed between a pair of the two or more related processes.

6. The method of claim 1, wherein the tracking interprocess message traffic between the two or more related processes of the multicore processor comprises tracking a bandwidth associated with message traffic between the two or more related processes.

7. The method of claim 1, wherein the assigning the two or more related processes to process affinity groups comprises establishing a process affinity graph from the affinity scores.

8. A non-transitory computer storage medium that includes computer-executable instructions stored thereon which, in response to execution by a computer, adapt the computer to perform a method to manage processes in a multicore processor using process affinity graphs, the method comprising:
monitoring interprocess message traffic for messages communicated between related processes executing on separate processor cores in the multicore processor;
determining affinity scores for pairs of the related processes based at least in part on the monitored interprocess message traffic using a total number of the messages communicated between the pairs of the related processes within a specified measurement period;
establishing a process affinity graph based upon the affinity scores; and
allocating one or more of the related processes to one or more processor cores of the multicore processor based upon affinity groupings identified within the process affinity graph,
wherein the allocating includes allocating the related processes within a same affinity group to physically adjacent separate processor cores within the multicore processor in response to the respective related pairs of processes having proximity within the process affinity graph.

9. The non-transitory computer storage medium of claim 8, the method further comprising causing the computer to relocate the related processes between the processor cores according to the allocation of the related processes.

10. The non-transitory computer storage medium of claim 8, the method further comprising:
causing the computer to evaluate the groupings;
subdivide one of the groupings into two or more subgroups; and
allocate each of the two or more subgroups to respective physically adjacent separate processor cores of the multicore processor.

11. The non-transitory computer storage medium of claim 8, the method further comprising causing the computer to decay the affinity scores according to a time function.

12. The non-transitory computer storage medium of claim 8, wherein the process affinity graph includes a first node, a second node, and an edge that connects the first node and the second node; and
wherein the first node represents a first process, the second node represents a second process related with the first process, and the edge represents the monitored interprocess message traffic between the first process and the second process.

13. A computing system configured to manage processes in a multicore processor using process affinity graphs, the computing system comprising:
a multicore processor unit including multiple processor cores;
a memory associated with the multicore processor unit; and
a processor module stored in the memory and configured to execute on the multicore processor unit such that the multicore processor unit is adapted to:
track interprocess message traffic for messages communicated between two or more related processes executing on separate processor cores of the multicore processor unit;
determine affinity scores between each pair of the two or more related processes based at least in part on the tracked interprocess message traffic, wherein determination of the affinity scores includes determination of a total number of messages passed between the two or more related processes within a specified measurement period;
assign the two or more related processes to process affinity groups based at least in part on the affinity scores; and
allocate the two or more related processes assigned to each process affinity group to one or more processor cores of the multicore processor based at least in part on the process affinity groups, wherein allocation of the two or more related processes includes allocation of the two or more related processes within a same process affinity group to physically adjacent separate processor cores within the multicore processor in response to higher affinity scores associated with the respective two or more related processes.

14. The multicore computing system of claim 13, wherein the multicore processor unit is further adapted by the processor module to tag a particular one of the related processes with an indicator of the affinity scores associated with the particular one of the related processes to be used during a future execution of the particular related process.

15. The multicore computing system of claim 13, wherein the multicore processor unit is further adapted by the processor module to adjust the affinity scores according to a time varying function.

16. The multicore computing system of claim 13, wherein the multicore processor unit is further adapted by the processor module to evaluate the groupings, subdivide one of the groupings into two or more subgroups, and allocate the two or more subgroups to separate processor cores of the multicore processor unit.

17. The multicore computing system of claim 13, wherein the multicore processor unit is further configured by the processor module to relocate the related processes from one of the cores to another of the cores of the multicore processor unit according to the allocation of the groupings.

18. The multicore computing system of claim 13, wherein the multicore processor unit is adapted by the processor module to monitor the message traffic between related processes such that a quantity of messages communicated between the related processes is determined during a measurement period.

19. A computer-implemented method to manage processes in a multicore processor using process affinity graphs, the method comprising:
- tracking interprocess traffic for a total number of messages communicated between two or more related processes executing on separate processor cores the multicore processor during a specified measurement period;
- determining affinity scores between each pair of the two or more related processes based at least in part on the total number of messages communicated, wherein the affinity scores decay over time;
- establish affinity groupings of the two or more related processes based at least in part on the affinity scores; and
- allocating the two or more related processes within a same affinity group to processor cores within the multicore processor according to the affinity scores such that two or more related processes having higher affinity scores execute on physically adjacent separate processor cores to support reduced interprocess messaging latency.

20. The method of claim 19, wherein reduced interprocess messaging latency comprises reduced delay caused by passing interprocess messages between intermediate processor cores.

21. The method of claim 19, wherein tracking interprocess traffic between two or more related processes executing on the multicore processor comprises tracking a quantity associated with the interprocess traffic between the two or more related processes.

22. The method of claim 19, wherein tracking interprocess traffic between two or more related processes executing on the multicore processor comprises tracking a bandwidth associated with interprocess traffic between the two or more related processes.

* * * * *

UNITED STATES PATENT AND TRADEMARK OFFICE
CERTIFICATE OF CORRECTION

| | | |
|---|---|---|
| PATENT NO. | : 8,856,794 B2 | Page 1 of 1 |
| APPLICATION NO. | : 12/578321 | |
| DATED | : October 7, 2014 | |
| INVENTOR(S) | : Kruglick | |

It is certified that error appears in the above-identified patent and that said Letters Patent is hereby corrected as shown below:

On the Title Page, Item (56), under "OTHER PUBLICATIONS", in Column 2, Line 1, delete "et al," and insert -- et al., --, therefor.

In the Specification

In Column 9, Line 58, delete "processor 12" and insert -- processor 11 --, therefor.

Signed and Sealed this
Tenth Day of March, 2015

Michelle K. Lee
*Deputy Director of the United States Patent and Trademark Office*